United States Patent [19]

Brueggemann et al.

[11] Patent Number: 4,805,974
[45] Date of Patent: Feb. 21, 1989

[54] POLYCONE ™ SCANNING SYSTEM WITH MULTIPLE BEAMS

[75] Inventors: Harry P. Brueggemann, San Marino; Melvin E. Swanberg, Claremont, both of Calif.

[73] Assignee: Xerox Corporation, Stamford, Conn.

[21] Appl. No.: 115,486

[22] Filed: Nov. 2, 1987

[51] Int. Cl.⁴ ............................................ G02B 26/10
[52] U.S. Cl. ...................................... 350/6.7; 350/6.1
[58] Field of Search ............................... 350/6.5–6.91; 346/108

[56] References Cited

U.S. PATENT DOCUMENTS

| | | | |
|---|---|---|---|
| 3,897,132 | 7/1975 | Meeussen et al. | 350/6.7 |
| 4,312,590 | 1/1982 | Harbaugh | 350/6.7 |
| 4,393,387 | 7/1983 | Kitamura | 347/108 |
| 4,622,564 | 11/1986 | Kaku et al. | 346/108 |
| 4,651,170 | 3/1987 | Chandler et al. | 346/108 |
| 4,662,709 | 5/1987 | Brueggemann | 350/6.7 |
| 4,682,842 | 7/1987 | Brueggemann | 350/6.7 |

Primary Examiner—Bruce Y. Arnold
Assistant Examiner—Martin Lerner

[57] ABSTRACT

This invention relates to a pyramid polygon scanner wherein the differential scan length between multiple beams can be eliminated by tilting the beams with respect to the photoreceptor surface. Then the beam with the shorter scan lengths when the beams are normal to the photoreceptor, travel a greater distance before they impinge on the photoreceptor. At the start or end of scan the scan angle is not zero, so the scan lengths for the beams with the larger travel distances are increased by the extra distance multiplied by the tangent of the scan angle. At the proper tilt angle, all scan lengths at the photoreceptor are the same. Since the angular scan rate of all the beams are always the same, over the entire scan, the scan lengths of the individual beams will always be the same, at any fraction of the total scan. Thus the information written onto the photoreceptor by the multiple beams will be in alignment for all simultaneous beams.

4 Claims, 2 Drawing Sheets

POLYCONE ™ SCANNING SYSTEM WITH MULTIPLE BEAMS

This invention relates to a multiple beam pyramid polygon raster output scanner wherein the differential scan length between the multiple beams can be eliminated by tilting the beams with respect to the photoreceptor or output surface.

BACKGROUND OF THE INVENTION

It is known that wobble can be corrected by double reflection from the active facet; see Meeussen et al., U.S. Pat. No. 3,897,132. But all previous embodiments of this concept have bow, which makes them unworkable. In copending application Ser. No. 876,648, a polygon system for correcting wobble by double reflection from the active facet, without bow, is disclosed. In that application, the angles of incidence at the first and second reflections from the facet are recognized as important to the effects of bow, and bow can be almost eliminated by the proper relation between these angles. Bow can be, for all practical purposes, entirely eliminated when the facets have a draft angle, which has a predetermined relation to the angles of incidence at the first and second reflection.

High speed printing with a single beam, double reflection, polygon scanner (dubbed Polycone ™ by the assignee herein), means a high rotation rate for the polygon. For some applications the angular rotation rate is so great that the centrifugal stress causes unacceptable strain in the polygon, and also that the power required to drive the polygon is unacceptably large.

A multi-beam scanning system, wherein two or more beams simultaneously scan separate lines on the photoreceptor, reduces the angular rotation rate of the polygon for the same output data rate. When a polygon scanner, for which the incoming beam is offset in the scan plane, is used with a multiple beam, there is no differential bow or differential scan length between the individual beams. But if the incoming beam is offset in the cross-scan plane, there is differential bow and scan length between the multiple beams. The Polycone is offset in the cross-scan plane, and has differential bow and differential scan length, if multiple beams are used.

According to the present invention, the differential scan length between multiple beams can be eliminated by tilting the beams with respect to the photoreceptor surface, and with respect to each other. Then the beam with the shorter scan lengths when the beams are normal to the photoreceptor, travel a greater distance before they impinge on the photoreceptor. At the start or end of scan the scan angle is not zero, so the scan lengths for the beams with the larger travel distances are increased by the extra distance multiplied by the tangent of the scan angle. At the proper tilt angle, all scan lengths at the photoreceptor are the same. Since the angular scan rate of all the beams are always the same, over the entire scan, the scan lengths of the individual beams will always be the same, at any fraction of the total scan. Thus the information written onto the photoreceptor by the multiple beams will be in alignment for all simultaneous beams.

DESCRIPTION OF THE DRAWINGS

For a more complete understanding of the invention, reference may be had to the following detailed description of the invention in conjunction with the drawings wherein.

DETAILED DESCRIPTION OF THE INVENTION

Figure 1:
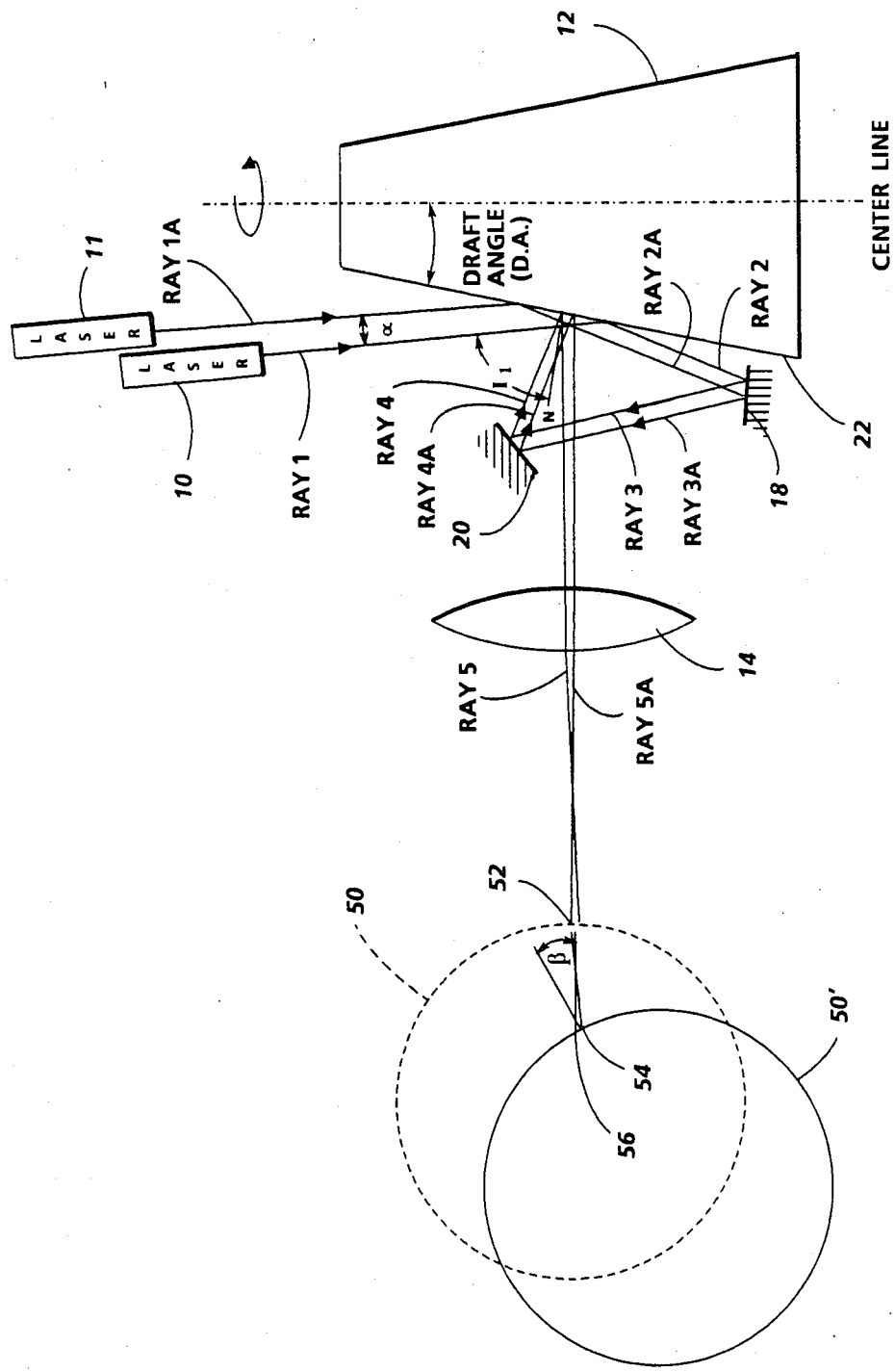
FIG. 1 is a schematic diagram of the rotating polygon multiple beam system in accordance with the present invention.

Much of the invention disclosed in said copending application is seen in FIG. 1, which is a section through the center of the scan. Rotating polygon 12 is seen to rotate about a line denoted as the center line. This polygon could have any number of facets, while for this application, the rotating polygon has eight distinct facets. Rather than having the plane of each facet parallel to the axis of rotation, or the center line as shown by the prior art, the facets are tilted at an angle toward the center line at an angle denoted as the "draft angle" (D.A.). Impinging upon one facet 22 of rotating polygon 12 is the light from laser 10. No optics are shown between the laser 10 and facet 22 for ease of illustration, but certain optics could be necessary depending upon the type of laser chosen. Ray 1 coming from the laser is co-planar with the center line, and is directed to facet 22 of rotating polygon 12, at an angle of incidence to the facet of value I1. The light strikes the polygon and is reflected off with the normal angle of incidence equalling the angle reflection. The angles that the rays make with the various reflective surfaces are fully discussed in said copending application, which is herein incorporated by reference.

After the light is reflected by facet 22, it travels to mirror surface 18. Thus, ray 2 is ray 1 reflected by facet 22. Whereas ray 1 is stationary in space regardless of the position of the polygon, ray 2 rotates as the polygon rotates. Mirror surface 18 must be large enough in the direction perpendicular to the paper so that ray 2 strikes it at all times during the active scan of facet 22. Ray 2 is reflected from mirror surface 18, and is shown as ray 3. From surface 18 the ray 3 travels to mirror surface 20, from which it is reflected as ray 4, seen in FIG. 1. Since ray 3 is rotating at the same angular rate as ray 2, the mirror surface 20 must be even larger than surface 18 to reflect ray 3 during active scan, because surface 20 is optically further from the facet 22 than surface 18. Ray 4 now travels back to surface 22, still with the same angular rate it had after being reflected from 22 as ray 2. Facet 22 need not be larger than mirror surface 20, in the direction of scan, to intercept all positions of ray 4, because the mirror is rotating in the same direction as ray 4, and "tracks" the ray. The spacing between mirrors 18 and 20, and facet 22, must be kept small so that the mirrors do not become too large. One skilled in the art of designing underfilled facet scanners will know how to choose the correct values of the laser beam parameters, so that the mirrors and the polygon do not become too large.

After reflection again by facet 22, ray 4 becomes ray 5, which is the ray that is corrected for facet-to-facet wobble after focusing by lens system 14, and at the same time will have no bow. The property possessed by ray 5 that makes it free of bow, is that when it is projected onto the plane of the paper (at the center of scan position) of FIG. 1, it is always parallel to itself. At various positions during the active scan, the ray 4 moves over the surface of facet 22, and its projection onto the center of scan position will be translated from the position of ray 4, but it will remain parallel to itself during this translation. This is true because the various angles have been chosen with the proper relation between them, and also the draft angle has been chosen to have the proper relation to them.

The beam surrounding ray 1 is collimated, all rays of the beam are parallel to each other. Mirror surfaces 18 and 20, as well as the facet 22, are all flat surfaces, with no optical power. Thus the beam surrounding ray 5 is still collimated. A scan lens 14 following the facet 22 will focus the parallel rays of the collimated beam around ray 5 as a small spot 52 at a document or a photosensitive surface 50, shown schematically in FIG. 1 as a dotted line circle. Since the projection onto the plane of the paper of all rays during the scan is the same point at the document or the photosensitive surface, then in three-dimensional space they must all lie on a straight line perpendicular to the plane of the paper. This is the scan line at the document or photosensitive surface, and since it is straight, it has no bow.

For the above described single laser scanner beam system, the scan line at the photoreceptor surface will be straight, with no bow. With a multiple beam system, however, one beam will have a shorter scan width due to the fact that the two laser beams are tilted at a slight angle to each other. If the beams were to be parallel, they would both come together at the same spot on the photosensitive surface 50, just as the collimated beam surrounding ray 5 is focussed at surface 50. To be able to write adjacent instead of superimposed scans, the lasers 10 and 11 are tilted at an angle $\alpha$ to each other.

Figure 2:
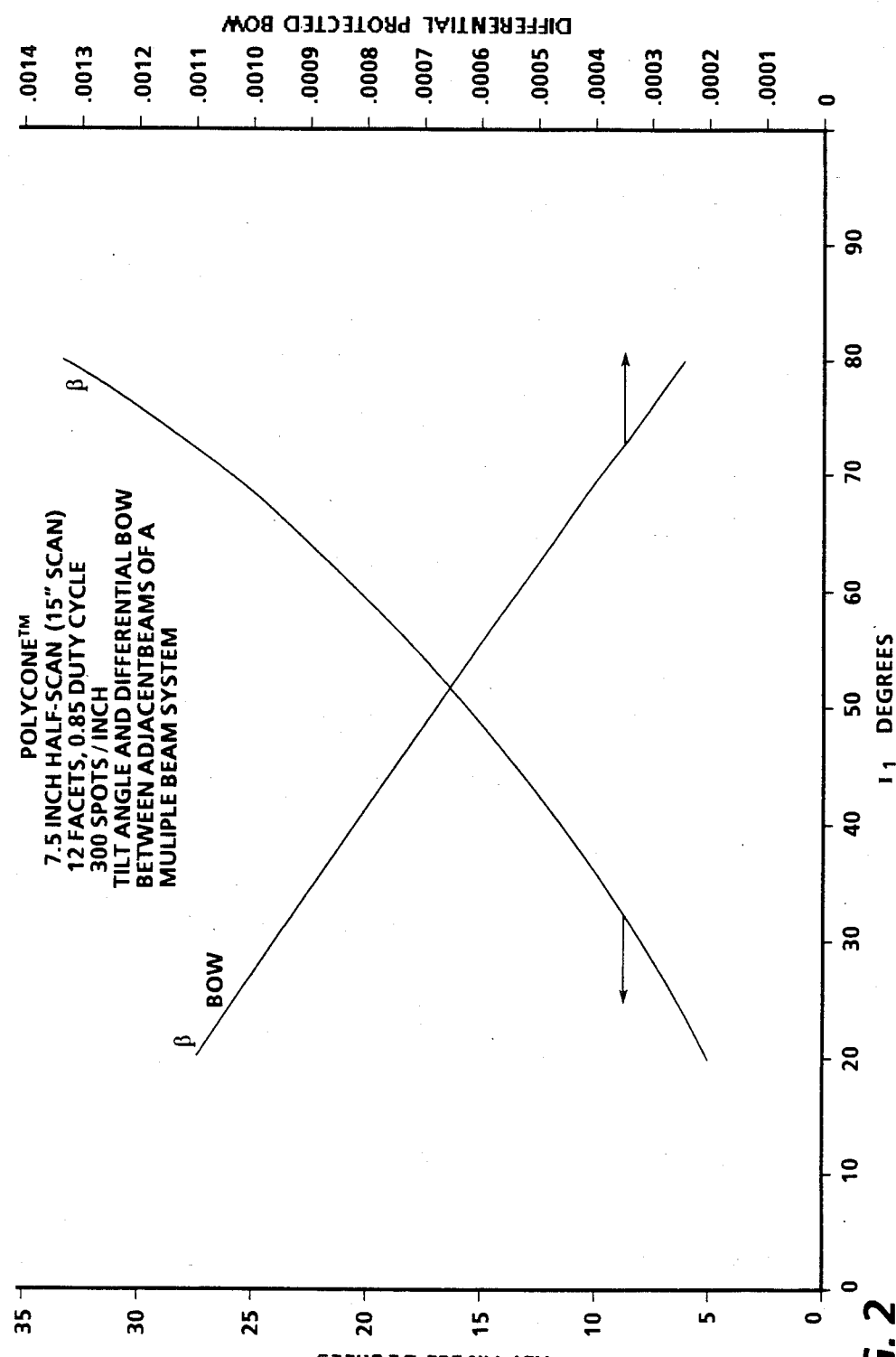
FIG. 2 is a family of curves representative of the tilt angle and differential bow between adjacent beams of a multiple beam system.

This differential tilt angle $\alpha$, which for the present application is about 41 arc-seconds, between the laser beams will cause the beams to scan slightly different lengths on the photosensitive surface, for the certain amount of polygon rotation. The beam with the smaller angle of incidence (I1) at the first facet reflection, will scan the greater distance. In FIG. 1 it is seen that ray 1 is at a slightly smaller angle of incidence, I1, than ray 1A. Thus, ray 5 scans a greater length on the photosensitive drum 50 than ray 5A. By tilting the drum so that ray 5 strikes the photosensitive surface of the drum at an angle $\beta$, as shown on the drum 50' which is offset from drum 50 so as to show the effect of tilt, it is seen that ray 5A travels a longer distance than ray 5, before it strikes the drum. The extra travel distance of ray 5A will allow it to scan a longer distance on the drum. If the tilt angle is chosen correctly, ray 5A and ray 5 will produce the same scan length. FIG. 2 shows the relation between the angle of incidence at the first reflection, I1, and the tilt angle $\beta$, to insure the same scan length for this particular scanner. Other scanner designs may have a different relation between I1 and $\beta$ for proper balance of the scan lines, this relation can be discovered by the designer if he understands this invention.

There is also differential bow between the two scan lines generated by rays 5 and 5A. This cannot be eliminated, but it can be minimized by increasing the angle of incidence, I1. Increasing I1 requires other adjustments to be made to the system; these are described in copending application Ser. No. 876,648. Besides these adjustments, the tilt angle $\beta$ must be increased. The amount of increase for Polycone is shown in FIG. 2. Other scanner designs may have a different relation between differential bow than Polycone and this can be discovered by the designer.

While the invention has been described with reference to a specific embodiment, it will be understood by those skilled in the art that various changes may be made and equivalents may be substituted for elements thereof without departing from the true spirit and scope of the invention. In addition, many modifications may be made without departing from the essential teachings of the invention.

What is claimed is:

1. In a rotating mirror scanning system including a multi-surface mirror assembly having plurality of surfaces and an axis of rotation, first and second light sources for introducing first and second sources of light beams toward said multi-surface mirror, said light beams being reflected in turn by each of said surfaces of said mirror, a first mirror placed in the path of said light beams reflected from said multi-surface mirrors, a second mirror placed in the path of said light beams reflected from said first mirror, said second mirror reflecting said light beams back to the same surface of said multi-surface mirror, the last reflection forming first and second scanning light beams of predetermined ranges of arc of one rotation of said multi-surface mirror, said multi-surface mirror assembly comprising a polygonal array of mirror facets, said mirror facets having a predetermined draft angle with respect to the axis of rotation of said multi-surface mirror assembly, and a photo-sensitive surface upon which said scanning light beams are to be raster drawn, said photo-sensitive surface being tilted with respect to said light beams to eliminate the differential scan length between said scanning light beams, wherein the scanning light beam with the shorter scan length, when the scanning light beams, are normal to said photosensitive surface, travels a greater distance before impinging on said photo-sensitive surface.

2. The mirror scanning system as set forth in claim 1 wherein said first and second light sources are tilted at a predetermined angle to one another.

3. The mirror scanning system as set forth in claim 1 wherein said first and second light sources are tilted at a predetermined angle $\alpha$ to one another, and wherein said photosensitive surface and said light beams are tilted at a predetermined angle $\beta$ from one another such that two parallel, offset scan lines of equal scan length are generated at said photosensitive surface.

4. The mirror scanning system as set forth in claim 4 wherein the values of $\alpha$ and $\beta$ have a predetermined relationship to one another for optimal generation of said parallel, offset scan lines of equal scan length.

* * * * *